United States Patent
Nöbauer et al.

(10) Patent No.: US 9,942,165 B2
(45) Date of Patent: Apr. 10, 2018

(54) METHOD FOR TRANSMITTING DATA IN A PACKET-ORIENTED COMMUNICATIONS NETWORK AND CORRESPONDINGLY CONFIGURED USER TERMINAL IN SAID COMMUNICATIONS NETWORK

(71) Applicant: CONTINENTAL AUTOMOTIVE GMBH, Hannover (DE)

(72) Inventors: Josef Nöbauer, Neukirchen-Balbini (DE); Helge Zinner, Magdeburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/400,507

(22) PCT Filed: May 7, 2013

(86) PCT No.: PCT/EP2013/059436
§ 371 (c)(1),
(2) Date: Nov. 11, 2014

(87) PCT Pub. No.: WO2013/167562
PCT Pub. Date: Nov. 14, 2013

(65) Prior Publication Data
US 2015/0156134 A1 Jun. 4, 2015

(30) Foreign Application Priority Data
May 11, 2012 (DE) .......... 10 2012 207 958

(51) Int. Cl.
*H04L 12/913* (2013.01)
*H04L 12/925* (2013.01)
(Continued)

(52) U.S. Cl.
CPC .......... *H04L 47/724* (2013.01); *H04L 47/722* (2013.01); *H04L 47/803* (2013.01); *H04L 47/805* (2013.01); *H04L 67/12* (2013.01)

(58) Field of Classification Search
None
See application file for complete search history.

(56) References Cited

U.S. PATENT DOCUMENTS 6,094,431 A * 7/2000 Yamato ............... H04L 12/5602
370/395.21
8,060,615 B2 11/2011 Finn
(Continued)

FOREIGN PATENT DOCUMENTS

| CN | 101779198 | 7/2010 | |
|---|---|---|---|
| EP | 1193920 A2 * | 4/2002 | ......... H04L 12/5695 |
| EP | 1 193 920 | 11/2011 | |

OTHER PUBLICATIONS

Office Action dated Jul. 27, 2016 which issued in the corresponding Chinese Patent Application No. 201380024561.9.

*Primary Examiner* — Huy D Vu
*Assistant Examiner* — James P Duffy
(74) *Attorney, Agent, or Firm* — Cozen O'Connor

(57) ABSTRACT

A method for transmitting data in a packet-oriented communications network, in particular of a motor vehicle and to a user terminal configured for carrying out the method. In the method, data packets are transmitted without a guaranteed transmission time for the data packets and with a guaranteed maximum transmission time for the data packets in said communications network. For a data transmission with a guaranteed transmission time, a specific quality of service is reserved prior to the data transmission by reservation request from the sender of the data to the receiver of the data and the data transmission with a guaranteed transmission time is only started once a confirmation of the (Continued)

reservation request sent by the sender has been received. In addition, selected data that is to be transmitted in a guaranteed transmission time is sent directly as a data stream of data packets and a reservation request is sent after the start of the data stream.

13 Claims, 2 Drawing Sheets

(51) Int. Cl.
*H04L 12/927* (2013.01)
*H04L 29/08* (2006.01)

(56) References Cited

U.S. PATENT DOCUMENTS

| | | |
|---|---|---|
| 2002/0199021 A1* | 12/2002 | Beier .................. H04L 12/413 709/246 |
| 2003/0058851 A1 | 3/2003 | Goldman |
| 2004/0254700 A1* | 12/2004 | Fehr .................. H04L 12/2602 701/36 |
| 2008/0298241 A1 | 12/2008 | Ohana et al. |
| 2009/0049175 A1 | 2/2009 | Finn |

* cited by examiner

METHOD FOR TRANSMITTING DATA IN A PACKET-ORIENTED COMMUNICATIONS NETWORK AND CORRESPONDINGLY CONFIGURED USER TERMINAL IN SAID COMMUNICATIONS NETWORK

CROSS REFERENCE TO RELATED APPLICATIONS

This is a U.S. national stage of application No. PCT/EP2013/059436, filed on May 7, 2013. Priority is claimed on German Application No.: DE102012207958.0 filed May 11, 2012, the content of which are incorporated here by reference.

BACKGROUND OF THE INVENTION

1. Field of the Invention

The invention relates to a method for transmitting data in a packet-oriented communications network, in particular of a motor vehicle, in which data packets can be transmitted in the communications network without a guaranteed transmission time for the data packets (also called background data traffic) and with a guaranteed maximum transmission time for the data packets. The packet-oriented communications network may be, in particular, a network according to the Ethernet AVB standard.

2. Description of the Prior Art

The method with a guaranteed maximum transmission time for the data packets provides for a certain quality of service, in particular a maximum transmission time, to be reserved along the communication connection, that is to say the route of the data packets in the communications network, before the data transmission using a reservation request from the sender of the data to the recipient of the data. This quality of service is guaranteed only after a confirmation of the reservation request for the data stream transmitted on the communication connection between the sender and recipient in the network, with the result that the data transmission with a guaranteed transmission time for the data packets is started only after the sender has received confirmation of the reservation request. After the reservation request has been forwarded via switches provided in the communication connection between the sender and recipient, the positive confirmation of the reservation request is finally emitted by the recipient intended for the data.

As parameters of the requested quality of service, the reservation request preferably comprises the data rate of the data stream, which the sender would like to provide for the transmission of the data, and the latency, that is to say the maximum transmission time, in the form of a quality of service class which specifies, inter alia, the maximum transmission time.

The background data traffic transmitted without a guaranteed transmission time for the data packets does not require any advance reservation. Therefore, for data packets transmitted in this manner, no reservation request is emitted in advance in the packet-oriented communications network.

In a motor vehicle, in addition to a temporally guaranteed transmission time for data packets, the start-up time of the network also plays an important role within the scope of many applications. The time which is required before it is possible to transmit data via this network after the network has been started is referred to as the start-up time. In this case, the starting point is a state in which the network was previously inactive. All required configurations, synchronizations and further starting mechanisms must then be concluded. In addition to starting the respective control device, the process of starting up a network therefore also includes the process of starting the network controller responsible for the network and setting up or initializing communication with the further network subscribers in the packet-oriented communications network (also referred to as network for short). In this case, an important critical point is the temporal synchronization of the network subscribers which only enables communication of a time-controlled network such as MOST, FlexRay, and Ethernet according to the AVB standard.

Conventional motor vehicle communications networks are typically MOST and FlexRay. They enable a start-up time of approximately 100 ms. In the case of FlexRay, this means that application messages can already be sent after 100 ms. In the case of MOST, this is then typically also followed by a determination of the network configuration, with the result that the application messages can typically be sent only after 500 ms. Only then is it possible to transmit data, for example a synchronized data stream, as part of a data stream.

During conventional use of the communications network in a motor vehicle, the start-up of the network can usually already be started when the parked vehicle is unlocked using the remote control (keyless entry) since it can be assumed that the driver either moves off or otherwise accesses functions of the motor vehicle which require network communication after getting into the vehicle. Due to the time needed to get into the vehicle, an extended start-up time on account of said reservation requests in the network is not a major problem.

However, situations in which the driver of a vehicle is sitting in a switched-off vehicle in a completely inactive manner for a relatively long time, for example because he is sleeping, and then suddenly starts the vehicle and moves off problematic. Before starting the vehicle, all control devices were inactive due to the relatively long time of inactivity. After starting the car, the warning tone of the parking aid must be audible in fewer than two seconds and/or the video image from the rear view camera must be visible in fewer than two seconds according to the conventional requirements, for example.

When transmitting audio and/or video signals and control data, synchronized transmission in the data network is important, which synchronized transmission is possible, for example, with the transmission via the Ethernet according to the AVB standard, as is currently provided for transmitting audio and video data. Due the extensive standardization and flexible configuration of the Ethernet AVB standard, there is interest for use in motor vehicles in which, after standardization in 2011, it is currently used but not yet to a significant extent. An important advantage of the Ethernet AVB standard is the assurance of quality of service (QoS) for the data to be transmitted if it are intended to be transmitted as streaming data. As a result of the stream reservation protocol MSRP (Multiple Stream Reservation Protocol) of the IEEE 802.1Qat standard, resources of the communications network and, in particular, of the switches which forward the individual data packets from the sender to the recipient must therefore be reserved in advance. Such reservation can ensure that the data transmitted using the IEEE 1722 or IEEE 1733 transport protocol arrive at the recipient with a guaranteed maximum delay.

This guarantee is part of the quality of service. The above-mentioned transport protocols ensure a maximum delay of the data packets when transporting the data or streaming data via the communications network. The arrival time cannot be determined without using these protocols or equivalent protocols. This arrival time is particularly important for audio and video data, for example. This does not play a significant role in the case of background data traffic or less important, non-time-critical data or data that does not have a temporal relationship with data transmitted using other data packets, with the result that no reservation is required for this data. Accordingly, no reservation requests are transmitted for this data either.

In contrast, if data, which is intended to be transmitted in a guaranteed transmission time in order to only enable or ensure particular applications are transmitted, the process running according to the Ethernet AVB standard cannot be circumvented or significantly accelerated. If a reservation request fails, no data at all can initially be transmitted as part of the Ethernet AVB standard until the transmission with the desired quality of service has been reserved. With this quality of service guarantee of data transmission, which is comparatively complicated in comparison with other communications networks, account is taken of the fact that the Ethernet as such is a very flexible network and in use is therefore highly suitable for a multiplicity of types of communication. However, in contrast to the conventional networks in motor vehicles, for example FlexRay or MOST, the start-up of the network, that is to say the time until possible transmission of data with a guaranteed quality of service (QoS), is considerably longer. In addition, the request for resources, which is dynamically configured by the reservation request, in the communications network along a desired communication connection may also result in a refusal if the desired quality of service cannot be achieved. This is synonymous with saying that data transmission is not possible.

For this reason, the MOST and FlexRay communications networks are used in networks of a motor vehicle for data transmissions that require a certain quality, which communications networks can be implemented in this respect with considerably faster reaction times for guaranteeing a quality of service when transmitting time-critical, for example real-time-critical, data on account of their rigid network topology which is firmly predefined in the motor vehicle. The Ethernet AVB standard which is also desirable for use in the motor vehicle on account of its flexibility competes with these two communications networks usually used in motor vehicles and, if used in the motor vehicle, for example if replacing the MOST and/or FlexRay communications networks, should also support at least their quality requirements with respect to the latency times and the message jitter for the transport of data.

The static part of the data transport in a FlexRay network, for example, is fully planned before the network is started, that is to say the data transport is already defined at the time of design. As a result, the communication in the FlexRay network can be predicted at any time. This is stipulated once before the production of an automobile, for example its line or special model, and lasts for the service life of the vehicle, but at least until a software update of all network subscribers in the vehicle's communications network.

SUMMARY OF THE INVENTION

One object of the present invention is to achieve a faster start of the transport of data for real-time-critical data, in particular, and/or for data transmitted when starting up the communications network in a communications network which operates according to the Ethernet AVB standard or a standard based on the latter and in which reservation requests must be transmitted, in particular, in order to guarantee a particular quality of service.

Provision is made, in particular, for selected data, in particular real-time-critical data and/or data transmitted when starting up the communications network, which are required, in particular, for an ability of the communications network to communicate quickly after being started, to be emitted immediately, that is to say without emitting a reservation request and waiting for a confirmation of the reservation request, as a data stream of data packets without a guaranteed transmission time even though the selected data are data which are intended to be transmitted in a guaranteed transmission time according to the invention. A reservation request for these data is then forwarded according to the invention only after the start of the data stream.

The invention therefore proposes emitting data streams of selected data immediately when said data are present without waiting for a confirmation of the reservation request (reservation response) which may take several 100 ms to a few seconds. This waiting time is therefore saved according to the invention, in which case the quality of service desired per se is not guaranteed within the scope of the transport protocol on account of this specification. However, this is then made up for by forwarding a reservation request for the data stream, with the result that the guaranteed transmission time can nevertheless be achieved at least for a multiplicity of data packets in the data stream.

Even if the first data packets in this data stream are emitted without the guaranteed transmission time, the overall transmission is often faster in practice than if a reservation request is first of all emitted and a confirmation of the latter is awaited. Therefore, the method is suitable, in particular, for particularly time-critical data which is intended to be transmitted in real time as far as possible. With this solution, the Ethernet AVB standard or a standard operating in a comparable manner becomes more similar to the method of operation of the MOST and FlexRay networks often used in motor vehicles. According to the invention, the transmission of real-time-critical data can therefore be considerably accelerated, with the result that special requirements from the automotive sector are subsequently met by this variant according to the invention of using an Ethernet AVB transport protocol even if the lack of quality of service guarantee initially makes it possible to assume that the initiation of a data stream without the quality of service guarantee does not lead to the desired result.

At this juncture, it is noted that the proposed method, even if it is specifically particularly suitable for use in communications networks in motor vehicles, is not restricted to this application but rather can generally be used when Ethernet AVB transport protocols according to the above-mentioned standards are intended to be used and particularly time critical data need to be transmitted. A typical application here can also be automation in production installations.

According to one embodiment of the invention, the subsequent reservation can also be used if, for example, an existing data stream is intended to be given a changed quality of service without the data stream being interrupted in the process.

One aspect of the invention provides, in particular, for the data stream of the selected data to be relabeled a data stream with a guaranteed transmission time for the data packets after receiving a confirmation of the forwarded reservation request. As a result of the relabeling "on the flight" as it were, the guaranteed transmission time for data packets in the data stream is then guaranteed from this time on and is therefore also reliably complied with. At this time at which the transmission of the data could only be started according to the normal Ethernet AVB standard, a multiplicity of the data has already been emitted, however, as data packets in the data stream, which each possibly per se do not comply with the guaranteed quality of service (although this is naturally equally possible) but usually arrive more quickly overall in typical applications, in particular in straightforward communications networks such as those in a motor vehicle with a limited number of subscribers, in comparison with a situation in which the confirmation of the reservation request is first of all awaited. The relabeling can be carried out in a simple manner according to the invention in the header of the data packets in the data stream, for example, in which case data packets in the data stream which have not yet been emitted are preferably already relabeled in the sender, with the result that, after receiving the confirmation of the data packet, the sender transmits only one data stream of data packets with a guaranteed transmission time.

One preferred further development of this proposed method can also provide for the data packets in the data stream along the communication connection (communication route or communication path) to be relabeled in switches in which the data packets are received and emitted again to the recipient along the communication connection. Since a switch must usually evaluate parts of the header of a data packet in the data stream anyway, the switch has access to the header, for example using its control device, and can accordingly convert an identification of the data packet in the data stream in the header. This can be reasonably already carried out according to the invention when the switch receives a reservation request from the sender for data packets in this data stream since the switch then already knows that these data are actually intended to be transmitted with the desired guaranteed transmission time or quality of service. However, this can be carried out at the latest when the switch receives the confirmation of the reservation request from the recipient because it is then known, in the communications network, that the resources are available in any case for transmission with the corresponding quality of service.

In this context, it is particularly advantageous according to one aspect of the invention if the data packets contain an identifier of the data stream, which identifier is also contained in the forwarded reservation request and the confirmation of the reservation request, with the result that each switch can identify a data packet in the data stream as belonging to this reservation request or confirmation.

In order to be able to emit the data stream in a corresponding standard even without receiving a confirmation message, the invention may provide for the data stream of the selected data to be initially declared to be data without a guaranteed transmission time for the data packets. This makes it possible to also implement the proposed invention in a standardized network, in particular the Ethernet AVB network, in which the transmission of data with a guaranteed transmission time can be started only after receiving a confirmation of a reservation request.

This therefore makes it possible to implement the invention without intervening in or violating the standard.

In one particularly simple embodiment of this idea according to the invention, another transport protocol which does not guarantee a transmission time for the data packets can be used within the scope of the Ethernet AVB standard, that is to say no transport protocols according to the IEEE 1722 or IEEE 1733 standards or comparable transport protocols are used in the case of the Ethernet AVB standard.

However, this results in the data stream of the selected data initially being handled as pure background data traffic. Therefore, one further development of the invention may also advantageously provide for a transport protocol which also makes it possible to transmit data with a guaranteed transmission time for the data packets to be used to transmit the data stream of the selected data, the setting of flags in the header of the data packets in the data stream being used to determine that they are (initially) not data in need of reservation, that is to say data which do not need to be transmitted in a guaranteed transmission time for the data packets and/or data which cannot be emitted only after a reservation request has been emitted and an associated confirmation of the reservation request has been received.

However, data packets with such flags in the header may then already be given preferential treatment in the switches, for example data which are emitted after a corresponding reservation with the quality of service guarantee. This can be carried out at least as long as there are still resources available for this purpose in the communications network. In addition, the use of a transport protocol, which, in addition to transmitting data with a guaranteed transmission time for the data packets, also allows the transmission of data without a guaranteed transmission time for the data packets, simplifies easier conversion or relabeling of the data packets in the data stream of the selected data as a data stream with a guaranteed transmission time for the data packets.

According to one aspect of the invention, the data stream of the selected data can be identified, within the scope of the Ethernet AVB standard, in particular using the transport protocols according to IEEE 1722 or IEEE 1733 or corresponding transport protocols, by defining a special VLAN ID or a multicast sender address in the header of the data packets, which ID or address, on the one hand, allows the data to be emitted without previously receiving a confirmation of the reservation request, and on the other hand, can be used in switches as an indicator of the fact that these data should be handled and forwarded with high priority, for instance in a manner corresponding to data packets which are transmitted with a guaranteed transmission time. This improves the smooth and fast transmission of data even at the beginning of the data stream of the selected data packets as long as the quality of service for this data stream has not yet been guaranteed.

The transmission of real-time-critical data, in particular, can be accelerated further by virtue of the fact that the communications network is statically preconfigured, for example during production and/or start-up, as is the case in FlexRay networks. This also makes it possible to circumvent the previous reservation request for such data. Data streams that must be quickly available after the system has been started are known to the system manufacturer of a communications network which is preferably closed per se or can be extended only in a defined manner, for example an Ethernet network in a motor vehicle according to the AVB standard, with the result that the electronic control units (ECU), in particular the switches, can be suitably preconfigured for forwarding the data packets along the communication connection and can provide these special data streams with the corresponding quality of service from the outset.

In addition to this setting, the communications network according to the invention can be configured or operated in such a manner that data traffic which has not been preconfigured (planned) is not transmitted at all when starting up the system by the electronic control devices (ECU). This safeguards the resources for particularly quick transmission of the data packets needed to start up the system.

This can therefore be achieved according to one aspect of the invention by virtue of the fact that, when starting up the communications network in particular, for example in a static preconfiguration, unplanned data traffic is not transmitted until the communications network is configured and enabled for general communication.

Accordingly, the present invention also relates to a subscriber device in a communications network, in particular of a motor vehicle, that is to say in particular a sender, a recipient and/or a switch of the communications network, having a transmitting/receiving device and a computing unit, the computing unit being set up to carry out communication in the communications network according to a communication protocol. The computing unit is additionally set up according to the invention to carry out the above-described method or parts of the latter by means of program code means.

Furthermore, the invention also relates to a computer program product having program code means which, when executed on a computing unit, are suitable for setting up the computing unit to carry out the above-described method or parts of the latter.

BRIEF DESCRIPTION OF THE DRAWINGS

Further features, advantages and possible uses of the present invention also emerge from the following description of an exemplary embodiment and the drawing. In this case, all described and/or depicted features per se or in any desired combination form the subject matter of the present invention even irrespective of their combination in the claims or their dependency references. In the drawing:

DETAILED DESCRIPTION OF THE PRESENTLY PREFERRED EMBODIMENTS

Figure 1:
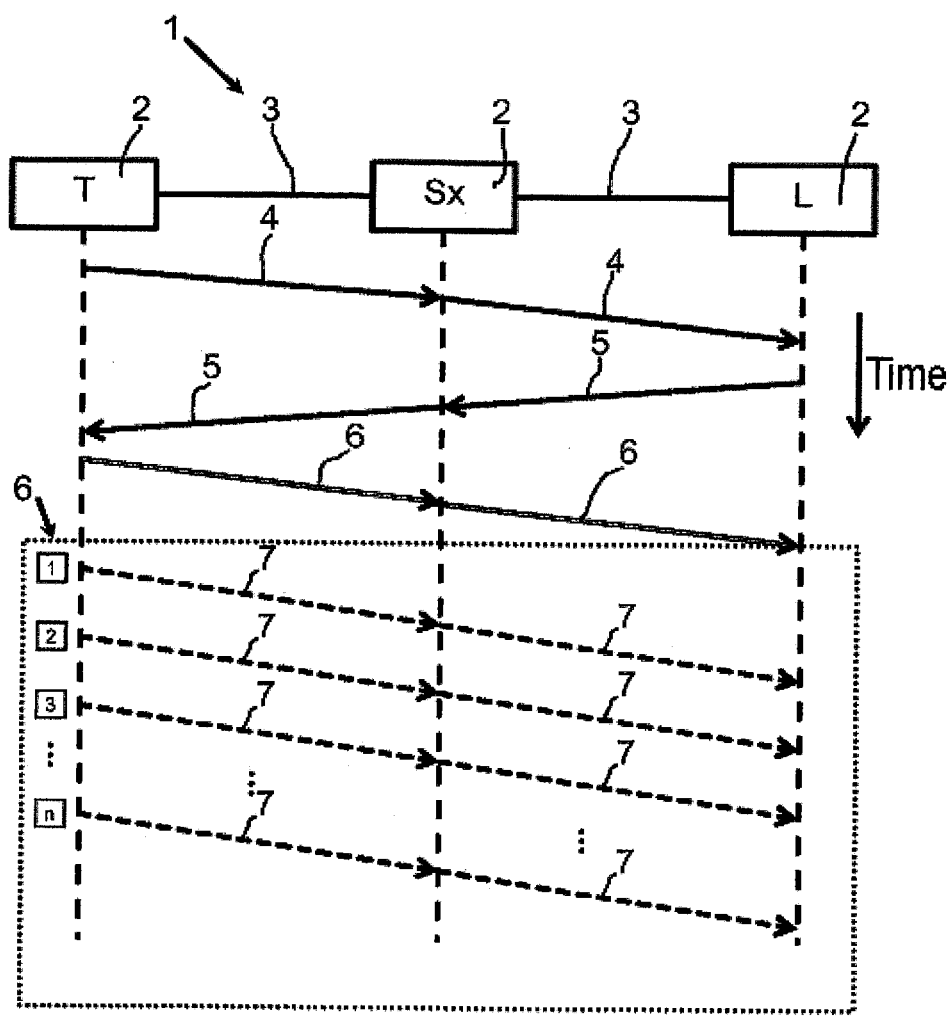
FIG. 1 is a sequence of communication in a communications network with a guaranteed transmission time for the data packets according to the Ethernet AVB standard.

FIG. 1 schematically illustrates, according to one aspect of the invention, a packet-oriented communications network 1 which may operate, in particular, according to the Ethernet AVB standard. Different network subscribers 2 also referred to as nodes are connected to one another via suitable data lines 3 in such a manner that they can interchange data with one another.

Communication fundamentally takes place in such a manner that a node 2 (teller) denoted T wishes to emit a data stream (stream) to another node 2 (listener) identified by L within the scope of the Ethernet AVB standard, for which purpose the data stream is forwarded through the data line 3 via switches Sx which are arranged between the sender T and the recipient L and also form a node 2 of the communications network 1. Communication can be carried out via none, one or a plurality of interposed switches.

A method for transmitting data is implemented within the scope of the Ethernet AVB standard, in which method data packets can be transmitted in the communications network 1 without a guaranteed transmission time for the data packets and with a guaranteed transmission time for the data packets depending on whether the normal Ethernet standard or the Ethernet AVB standard is used to transmit the data.

FIG. 1 schematically illustrates, in a simplified manner, the method sequence for transmitting data with a guaranteed transmission time from the sender T of the data to the recipient L of the data in a manner corresponding to the Ethernet AVB standard according to the IEEE 1722 or IEEE 1733 transport protocol using the dashed axes illustrated under the node 2 in the direction of the time.

If a network subscriber or node 2 as the sender T would like to transmit data that requires a certain quality to another network subscriber or node 2 as the recipient L, a check must be carried out beforehand by interchanging so-called MSRP messages in order to determine whether sufficient resources, for example the data rate, are available in the communications network 1 in order to be able to guarantee the particular data transmission quality. For this purpose, if the sender T wishes to transmit a data stream with a guaranteed transmission time for the data packets, the sender T emits a reservation request 4 before the actual transmission of data, which request is received by the next subscriber, the switch Sx in the example illustrated.

The reservation request 4 contains, as parameters, the requested quality of service and the data rate of the data stream, in particular. On the basis of this information, the switch Sx checks whether it is able to process such a data stream in the required quality. If the switch Sx can provide the required resources in the communications network 1, it forwards the reservation request 4 to the next subscriber in the communications network 1 which may be another switch Sx or else, as illustrating the communication connection here in a shortening manner, the recipient L of the data stream addressed by the sender T.

If the potential recipient L receives the reservation request 4 and would also like to receive the data stream 6, it generates a confirmation 5 of the reservation request 4 which it transmits back to the sender T via the communications network 1, and therefore the switch Sx. Only when the sender T has received this confirmation 5 can it start the transmission of the data stream 6 as an AVB data stream with a guaranteed transmission time for the data packets according to the AVB standard 802.1Qat. The emission of the data stream 6 temporally follows the emission of the reservation request 4 and the reception of the confirmation 5 of the reservation request 4. This is illustrated in FIG. 1 according to the temporal direction indicated by the arrow.

The data stream 6 is illustrated in more detail in the dotted field 6. This data stream is constructed from individual data packets 7 which are emitted in a particular temporal sequence, for example 125 µs.

In the box representing the data stream 6, the data packets from the sender T are numbered consecutively with the numbers 1, 2, 3 to n. The transmission path for the data stream 6 (that is to say the communication connection for the data stream) is effected using precisely the switch Sx which also forwarded the reservation request 4 to the recipient L and in the process confirmed the resources available for the desired quality of transmission.

The data packets 7 are therefore transmitted as data packets with a guaranteed transmission time (AVB data packets) and are available in the recipient L after the guaranteed transmission time. The communications network 1 proposed according to the invention is entirely able to also carry out this standard method.

However, as can be gathered from FIG. 1, a considerable amount of time, typically more than 100 ms to a few seconds, elapses until the emission of the actual data stream 6 is started after the starting of a reservation request 4 since the transmission of the reservation request 4 to the recipient L via one or more witches Sx must first be awaited, which recipient then in turn confirms in the case of resources positively decided by the switches Sx and transmits the corresponding confirmation 5 of the reservation request 4 back to the sender T via the network in the communications network 1 before the sender begins to actually transmit the data.

This is disadvantageous in the case of real-time-critical data and/or even when starting up the communications network 1, in which these real-time-critical data must be transmitted as configuration data for setting up the network, in so far as the process of setting up the communications network 1 until operational readiness for transmitting data lasts a while which is not always available when used in a motor vehicle in this form, for example.

Therefore, the present invention additionally proposes a method for transmitting data which can be used in the case of selected, in particular real-time-critical, data. This method is explained in more detail below with reference to FIG. 2.

The underlying, packet-oriented communications network 1 is the same communications network 1 as has already been explained with reference to FIG. 1, with the result that it is possible to dispense with a repeated description of the network subscribers 2 (sender T, switch Sx, recipient L) here.

Apart from the above-described method for transmitting data packets 7 with a guaranteed transmission time, so-called background data traffic can be transmitted at any time in an Ethernet AVB network, that is to say the transmitted data packets 8 are emitted without a guaranteed transmission time for the data packets 8. The invention uses this possibility and proposes the practice of marking the data stream 6 as data packets 8 without a guaranteed transmission time (background data packets) for selected data which have to be transmitted in a particularly fast manner even if the agreement for a particular quality would be required on account of the particularly quick data transmission strived for per se.

For this purpose, another transport protocol, for example, can be determined for the data instead of the IEEE 1722 or IEEE 1733 transport protocol. Alternatively, it is also possible, by setting particular flags (markings) in the header of the data packet 8 within the scope of the IEEE 1722/IEEE 1733 transport protocol, to determine that this is not AVB data traffic in need of reservation, that is to say is not transmission with a guaranteed transmission time for the data packets 7. Whilst retaining the Ethernet AVB standard, this can be effected by defining a special VLAN ID or a multicast sender address, for example.

The electronic control devices (ECU), which are incorporated in the communications network 1 as network subscribers or nodes 2, are notified, preferably by static pre-configuration, that no reservation is required for data packets 8 with this flag in their header in order to forward or transmit or receive the data traffic. For this purpose, previously defined flags are stored in a network subscriber 2, in particular a switch Sx, for example in a table or another suitable storage area, and an action is defined. The senders T can therefore transmit or emit data streams with data packets 8 marked in this manner immediately, these data packets also being forwarded immediately to the recipient L by the switches Sx of the communication connection.

Figure 2:
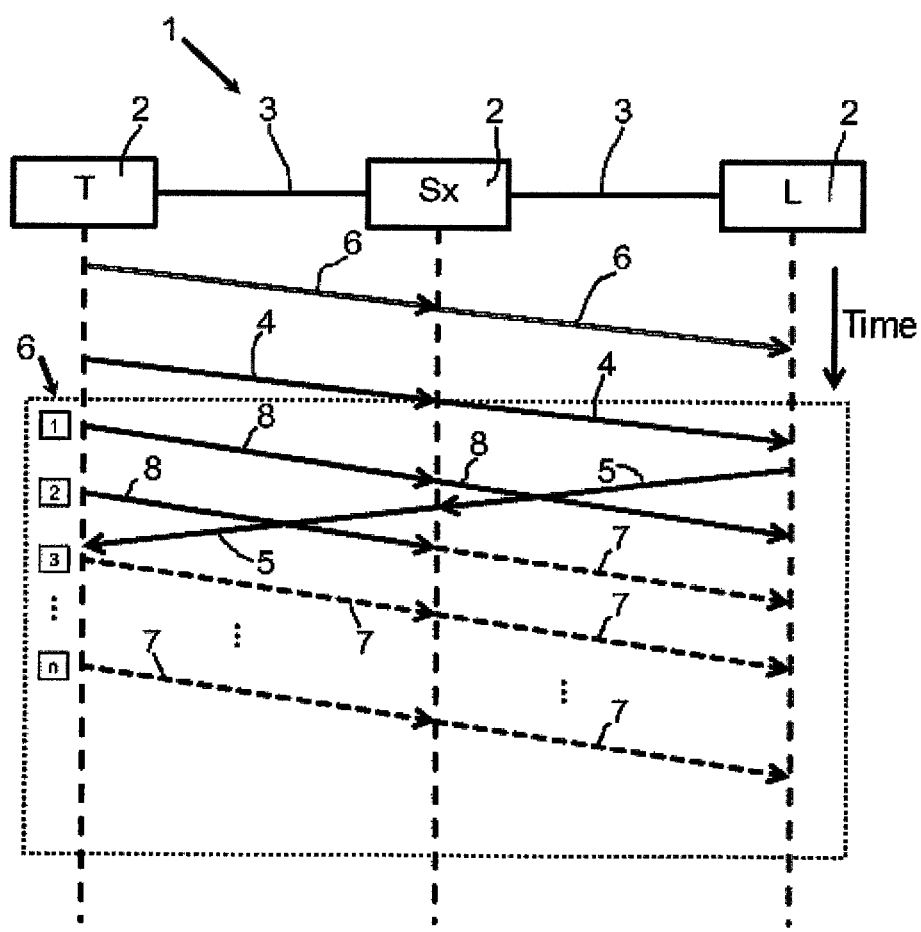
FIG. 2 is a corresponding sequence for the method according to the invention in which the data stream is emitted immediately without waiting for a corresponding reservation confirmation.

Since no guaranteed transmission time for the data packets 8 is agreed for this transmission, the transmission can begin with a certain delay, for example, and the interval of time between the data packets 8 without a guaranteed transmission time can also vary over the course of the transmission. This is illustrated in FIG. 2 by the comparatively large interval of the first data packet 8 below the initiation of the data stream 6. These delays may also result if the switches Sx detect the flags in the data and preferably forward the accordingly marked data packets.

To eliminate this uncertainty and use the advantages of the Ethernet AVB standard or a comparable standard in which the data packets 7 are transmitted with a guaranteed transmission time, a reservation request 4 is forwarded by the sender temporally after the initiation of the data stream 6, which reservation request is received by the switch Sx in a manner corresponding to a regular reservation request 4, is checked and, in the event of possible provision of the requested resources, is forwarded to the recipient L. The latter checks whether it wishes to receive the data stream and transmits the confirmation 5 of the reservation request 4 back after a positively concluded check. This confirmation is received in the switch Sx which already has data packets 8 without a guaranteed transmission time on account of the immediately initiated data stream 6 and forwards them to the recipient L, an identification of the data packets 8 in the data stream 6 and of the confirmation 5 of the reservation request preferably being able to be detected using an identification associated with the data stream 6.

Therefore, the switch Sx changes to relabeling a data packet 8 which has also been received without a guaranteed transmission time to a data packet 7 with a guaranteed transmission time as soon as the corresponding confirmation 5 of the reservation request 4 is present in the switch Sx. In FIG. 2, this process is the case for the second data packet which has also been emitted by the sender T as a data packet without a guaranteed transmission time.

Furthermore, the switch Sx forwards the confirmation 5 of the reservation request 2 to the recipient T which receives the confirmation before emitting the third data packet in the data stream 6. Therefore, this third data packet is equally emitted as a data packet 7 with a guaranteed transmission time. From this time on, transmission again runs in a similar manner to the normal Ethernet AVB standard, in which case the transmission of the data using the proposed method is faster overall since the waiting time (illustrated in FIG. 1) before the start of the emission of the data stream 6 is dispensed with.

Alternatively, the invention can naturally provide for the Ethernet AVB standard to be adapted in such a manner that the data are equally marked as data packets 8 with a guaranteed transmission time and the data can nevertheless be emitted before receiving the confirmation message 5 for the reservation request 4. According to the situation described above, the data quality on the entire transmission path is then guaranteed after receiving the confirmation 5 of the reservation request 4.

This makes it possible to transmit time-critical data, in particular when restarting (starting up) the communications network 1, in a particularly fast manner, in which case the operations of transmitting the data and reserving the quality of service strived for per se take place in a parallel manner according to the invention at the beginning of the transmission process. For this purpose, it is particularly advantageous if the communications network 1 is statically preconfigured at least for communication paths which occur often in such cases because preferential treatment of the data packets 8 without a guaranteed transmission time is also easily possible when the quality of service cannot yet be guaranteed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data in a packet-oriented communications network, in which first data packets are transmitted without a guaranteed transmission time and with a guaranteed maximum transmission time for second data packets, comprising:
    identifying, during startup, a data stream of the second data packets preconfigured for transmission with the guaranteed maximum transmission time;
    providing each of the second data packets with an identifier;
    immediately emitting selected data during startup intended to be transmitted in a guaranteed transmission time as a data stream of second data packets, without emitting a reservation request and waiting for a confirmation of the reservation request based at least in part on the identifier, the identifier providing preferential treatment in network devices prior to the reservation request being emitted; and
    forwarding the reservation request including the identifier after a start of the transmission of the data stream of the selected data intended to be transmitted as the second data packets.

2. The method as claimed in claim 1, wherein the data stream is relabeled with a guaranteed transmission time for the second data packets after receiving a confirmation of the forwarded reservation request based at least in part on the identifier.

3. The method as claimed in claim 2, wherein the first and second data packets in the data stream along a communication connection are relabeled in switches in which the first and second data packets are received and emitted again based at least in part on the identifier.

4. The method as claimed in claim 1, wherein the data stream is initially declared to be a transmission of data without a guaranteed transmission time for the first data packets.

5. The method as claimed in claim 1, wherein a transport protocol is configured to transmit data with a guaranteed transmission time for the second data packets for the data stream, a setting of flags in a header of the first data packets in the data stream being used to determine that they are not data in need of reservation.

6. The method as claimed in claim 5, wherein the data stream of the selected data is identified, within a scope of an Ethernet AVB standard, by defining one of a special VLAN ID and a multicast sender address.

7. The method as claimed in claim 5, wherein the first data packets with a set flag in the header are handled with high priority by switches.

8. The method as claimed in claim 1, wherein the communications network is statically preconfigured.

9. The method as claimed in claim 1, wherein, when starting up the communications network, unplanned data traffic is not transmitted until the communications network has been configured.

10. A subscriber device in a communications network, comprising:
    a transmitting/receiving device; and
    a computing unit, the computing unit configured to carry out communication in the communications network according to a communication protocol, wherein the computing unit is configured to execute program code to:
    identify a data stream, during startup of the subscriber device, of the second data packets preconfigured for transmission with the guaranteed maximum transmission time;
    providing each of the second data packets with an identifier;
    immediately emit selected data during startup intended to be transmitted in a guaranteed transmission time as a data stream of second data packets, without emitting a reservation request and waiting for a confirmation of the reservation request based at least in part on the identifier, the identifier providing preferential treatment in network devices prior to the reservation request being emitted; and
    forward a reservation request, including the identifier, after a start of the transmission of the data stream of the selected data intended to be transmitted as the second data packets.

11. A nontransitory computer readable media having program code which, when executed on a computing unit, is configured to:
    identify, during startup, a data stream of the second data packets preconfigured for transmission with the guaranteed maximum transmission time;
    providing each of the second data packets with an identifier;
    immediately emit selected data during startup intended to be transmitted in a guaranteed transmission time as a data stream of second data packets, without emitting a reservation request and waiting for a confirmation of the reservation request based at least in part on the identifier, the identifier providing preferential treatment in network devices prior to the reservation request being emitted; and
    forward a reservation request, including the identified, after a start of the data stream of the selected data intended to be transmitted as the second data packets.

12. The method as claimed in claim 1, wherein the packet-oriented communications network is a network for a motor vehicle.

13. The method as claimed in claim 1, wherein the network comprises at least one of the sender, the recipient and a switch.

* * * * *